US012279214B2

(12) United States Patent
Hosseini et al.

(10) Patent No.: US 12,279,214 B2
(45) Date of Patent: Apr. 15, 2025

(54) RESOURCE ALLOCATION IN UPLINK AND SIDELINK COEXISTENCE

(71) Applicant: QUALCOMM Incorporated, San Diego, CA (US)

(72) Inventors: Seyedkianoush Hosseini, San Diego, CA (US); Wei Yang, San Diego, CA (US); Qing Li, Princeton Junction, NJ (US); Gokul Sridharan, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 459 days.

(21) Appl. No.: 17/657,210

(22) Filed: Mar. 30, 2022

(65) Prior Publication Data

US 2022/0330178 A1 Oct. 13, 2022

Related U.S. Application Data

(60) Provisional application No. 63/169,079, filed on Mar. 31, 2021.

(51) Int. Cl.
*H04W 52/36* (2009.01)
*H04W 52/22* (2009.01)
*H04W 74/0816* (2024.01)

(52) U.S. Cl.
CPC ....... *H04W 52/367* (2013.01); *H04W 52/221* (2013.01); *H04W 74/0816* (2013.01)

(58) Field of Classification Search
CPC ............. H04W 52/367; H04W 52/221; H04W 52/383; H04W 72/25; H04W 74/0816
See application file for complete search history.

(56) References Cited

U.S. PATENT DOCUMENTS 10,341,000 B2 * 7/2019 Lee .................. H04L 1/1812
10,439,698 B2 * 10/2019 Lee .................. H04W 24/10
11,356,164 B2 * 6/2022 Raghavan ............ H04L 5/0051
(Continued)

FOREIGN PATENT DOCUMENTS

EP 3714643 B1 * 2/2024 ............. H04W 4/40
WO 2017135126 A1 8/2017

OTHER PUBLICATIONS

3GPP TS 38.213: "3rd Generation Partnership Project, Technical Specification Group Radio Access Network, NR, Physical Layer Procedures For control (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V16.5.0, Mar. 30, 2021, XP052000308, pp. 1-183.
(Continued)

*Primary Examiner* — Hai V Nguyen
(74) *Attorney, Agent, or Firm* — Paul M. McAdams; Shumaker & Sieffert, PA

(57) ABSTRACT

Certain aspects of the present disclosure provide techniques for wireless communications by a user equipment. An example method generally includes transmitting, on a sidelink channel using a first power level, a reservation of a resource for a sidelink transmission by the UE; determining to use a second power level for the reserved resource for the sidelink transmission; and transmitting on the sidelink channel on the reserved resource using the second power level.

19 Claims, 9 Drawing Sheets

(56) References Cited

U.S. PATENT DOCUMENTS

| | | | | |
|---|---|---|---|---|
| 11,476,982 | B2* | 10/2022 | Sengupta | H04L 1/1664 |
| 11,490,365 | B2* | 11/2022 | Lin | H04L 5/0055 |
| 11,510,179 | B2* | 11/2022 | Chae | H04W 72/0453 |
| 11,570,659 | B2* | 1/2023 | Wang | H04W 24/10 |
| 11,576,148 | B2* | 2/2023 | Lee | H04W 72/56 |
| 11,589,336 | B2* | 2/2023 | Bharadwaj | H04L 5/0051 |
| 11,800,439 | B2* | 10/2023 | Azizi | H04W 4/70 |
| 11,805,496 | B2* | 10/2023 | Hosseini | H04L 1/0003 |
| 11,877,299 | B2* | 1/2024 | Sengupta | H04L 1/1854 |
| 11,889,475 | B2* | 1/2024 | Lee | H04L 1/1896 |
| 11,889,495 | B2* | 1/2024 | Baghel | H04W 72/0446 |
| 11,929,811 | B2* | 3/2024 | Elshafie | H04W 72/40 |
| 11,956,679 | B2* | 4/2024 | Cao | H04W 72/56 |
| 11,963,136 | B2* | 4/2024 | Yang | H04W 76/14 |
| 12,075,366 | B2* | 8/2024 | Lee | H04W 52/0245 |
| 12,156,177 | B2* | 11/2024 | Freda | H04W 72/569 |
| 2018/0034526 | A1* | 2/2018 | Lee | H04B 7/0647 |
| 2018/0092085 | A1* | 3/2018 | Shaheen | H04W 36/0094 |
| 2018/0097603 | A1* | 4/2018 | Lee | H04L 5/0091 |
| 2018/0242190 | A1* | 8/2018 | Khoryaev | H04W 4/40 |
| 2020/0228949 | A1* | 7/2020 | Bharadwaj | H04L 5/0044 |
| 2020/0229144 | A1* | 7/2020 | Bharadwaj | H04W 72/20 |
| 2020/0229171 | A1* | 7/2020 | Khoryaev | H04W 4/40 |
| 2020/0260386 | A1 | 8/2020 | Ryu et al. | |
| 2021/0127361 | A1* | 4/2021 | Yasukawa | H04W 4/70 |
| 2021/0153169 | A1* | 5/2021 | Lin | H04L 5/006 |
| 2021/0167834 | A1* | 6/2021 | Raghavan | H04B 7/0695 |
| 2021/0243749 | A1* | 8/2021 | Hoang | H04W 74/085 |
| 2021/0282115 | A1* | 9/2021 | Sengupta | H04W 72/046 |
| 2021/0321430 | A1* | 10/2021 | Baghel | H04W 72/1263 |
| 2021/0376966 | A1* | 12/2021 | Sengupta | H04L 1/1829 |
| 2022/0201546 | A1* | 6/2022 | Wang | H04W 72/02 |
| 2022/0201654 | A1* | 6/2022 | Lee | H04W 72/20 |
| 2022/0217655 | A1* | 7/2022 | Lee | H04W 52/343 |
| 2022/0225280 | A1* | 7/2022 | Yang | H04W 52/0241 |
| 2022/0260386 | A1* | 8/2022 | Suzuki | G01C 21/3833 |
| 2022/0369345 | A1* | 11/2022 | Aktas | C11D 3/2086 |
| 2023/0036477 | A1* | 2/2023 | Abotabl | H04W 72/20 |
| 2023/0127780 | A1* | 4/2023 | Lee | H04W 72/20 370/329 |
| 2023/0224764 | A1* | 7/2023 | Dutta | H04L 5/0035 370/329 |
| 2023/0247654 | A1* | 8/2023 | Zhang | H04L 5/0092 370/329 |
| 2023/0371070 | A1* | 11/2023 | Lin | H04W 72/0446 |
| 2024/0064564 | A1* | 2/2024 | Blasco Serrano | H04W 28/0289 |
| 2024/0080877 | A1* | 3/2024 | Lee | H04L 1/1854 |
| 2024/0114485 | A1* | 4/2024 | Balasubramanian | H04W 72/20 |
| 2024/0163900 | A1* | 5/2024 | Davydov | H04B 7/024 |
| 2024/0178947 | A1* | 5/2024 | Teyeb | H04W 88/04 |
| 2024/0187935 | A1* | 6/2024 | Rao | H04W 72/02 |
| 2024/0214150 | A1* | 6/2024 | Xiao | H04B 7/0695 |

OTHER PUBLICATIONS

3GPP TS 38.214: "3rd Generation Partnership Project, Technical Specification Group Radio Access Network, NR, Physical layer procedures for data (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V16.5.0, Mar. 30, 2021, XP052000310, 171 Pages.

"3rd Generation Partnership Project, Technical Specification Group Radio Access Network, NR, Multiplexing and Channel Coding (Release 16)", 3GPP Standard, Technical Specification, 3GPP TS 38.212, 3rd Generation Partnership Project, Mobile Competence Centre, 650, Route Des Lucioles, F-06921 Sophia-Antipolis Cedex, France, vol. RAN WG1, No. V16.5.0, Mar. 30, 2021, XP052000306, pp. 1-152.

International Search Report and Written Opinion—PCT/US2022/071487—ISA/EPOPCT/US2022/071487—Sep. 2, 2022, 22 Pages.

OPPO: "Discussion on Remaining Open Issue for Mode 2", 3GPP TSG-RAN WG1 Meeting #100e, R1-2000493, 3rd Generation Partnership Project, Mobile Competence Centre, 650, Route Des Lucioles, F-06921 Sophia-Antipolis Cedex, France, vol. RAN WG1 No. e-Meeting, Feb. 24, 2020-Mar. 6, 2020, Feb. 15, 2020, XP051853330, 14 Pages.

Partial International Search ReportPCT/US2022/071487—PCT/US2022/071487PCT/US2022/071487—ISA/EPOPCT/US2022/071487—Jul. 12, 2022, 14 Pages.

Samsung: "Discussion on SCI Contents", 3GPP TSG RAN WG1 #85, R1-164765 Sci_Final, 3rd Generation Partnership Project, Mobile Competence Centre, 650, Route Des Lucioles, F-06921 Sophia-Antipolis Cedex, France, vol. RAN WG1, No. Nanjing, China, May 23, 2016-May 27, 2016, May 14, 2016, XP051089923, pp. 1-4.

* cited by examiner

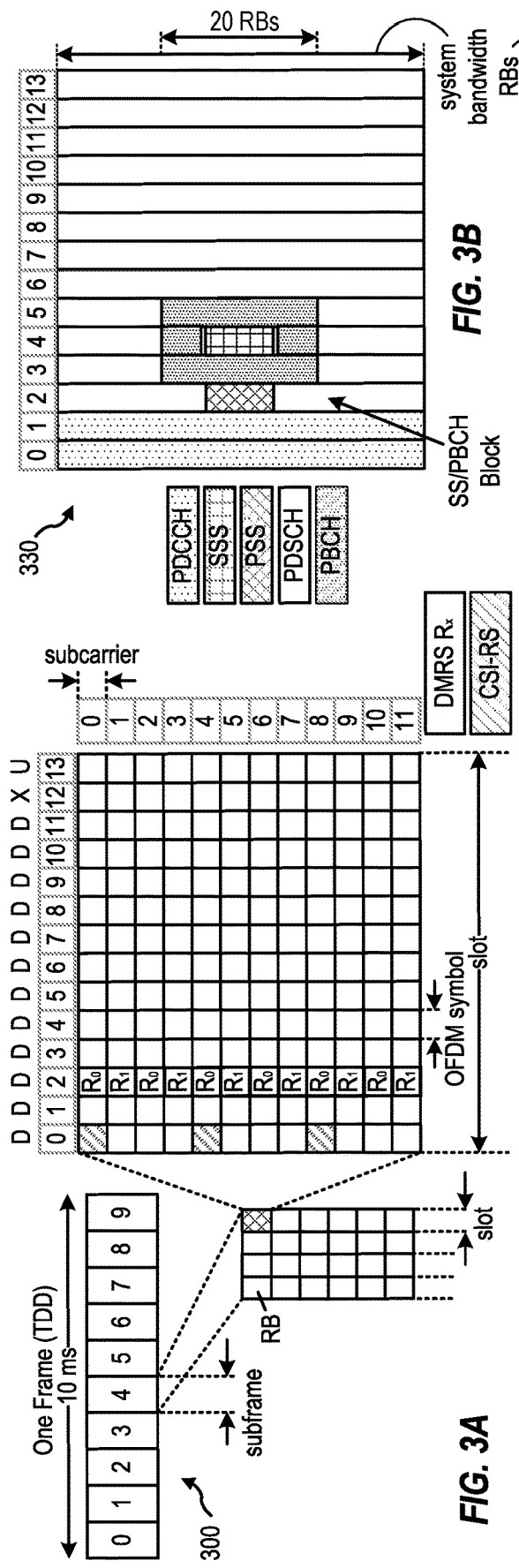
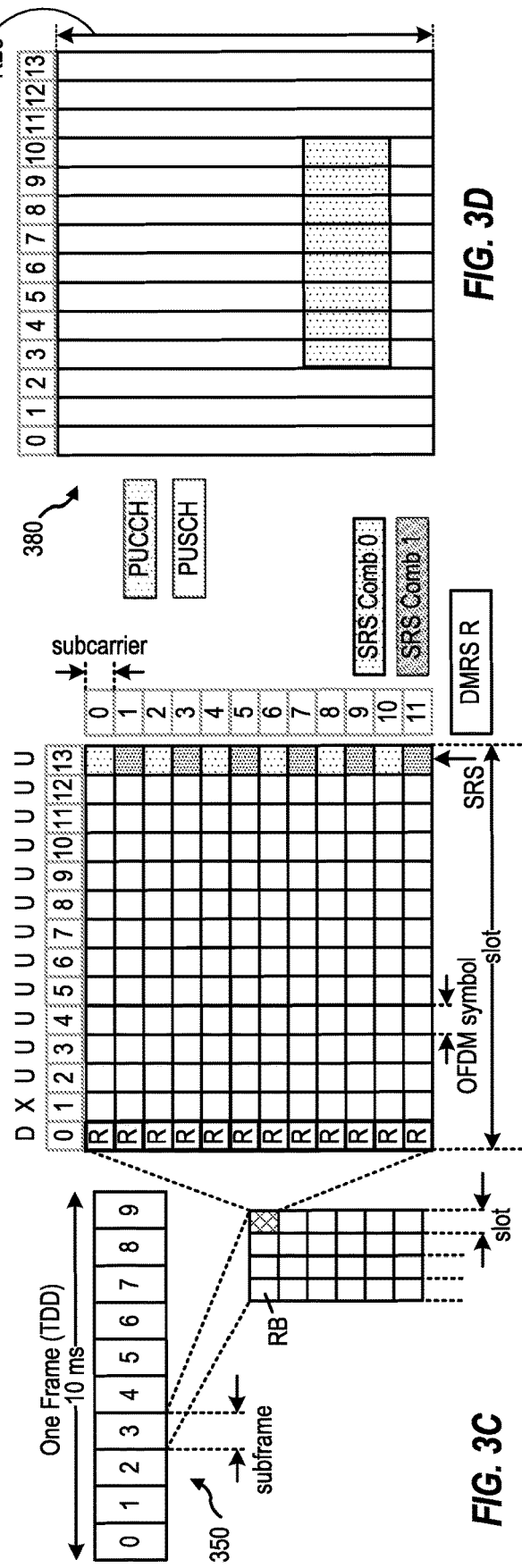

RESOURCE ALLOCATION IN UPLINK AND SIDELINK COEXISTENCE

CROSS-REFERENCE TO RELATED APPLICATIONS

This application claims benefit of and priority to U.S. Patent Application Ser. No. 63/169,079, entitled "Resource Allocation in Uplink and Sidelink Coexistence," filed Mar. 31, 2021, and assigned to the assignee hereof, the contents of which are hereby incorporated by reference in its entirety.

INTRODUCTION

Aspects of the present disclosure relate to wireless communications, and more particularly, to techniques for resource allocation in uplink and sidelink coexistence scenarios.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment. The method generally includes transmitting, on a sidelink channel using a first power level, a reservation of a resource for a sidelink transmission by the UE; determining to use a second power level for the reserved resource for the sidelink transmission; and transmitting on the sidelink channel on the reserved resource using the second power level.

One aspect provides a method for wireless communications by a user equipment. The method generally includes receiving, from a second UE, signaling indicating reserved resources for sidelink transmission by the second UE, wherein the signaling is received at a first power level; detecting a transmission, from the second UE, on a first resource of the reserved resources; determining, based on the detected transmission on the first resource, whether a second resource of the reserved resources is available for use by the UE; and transmitting on the second resource based on a determination that the second resource is available for use by the UE.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Figure 1:
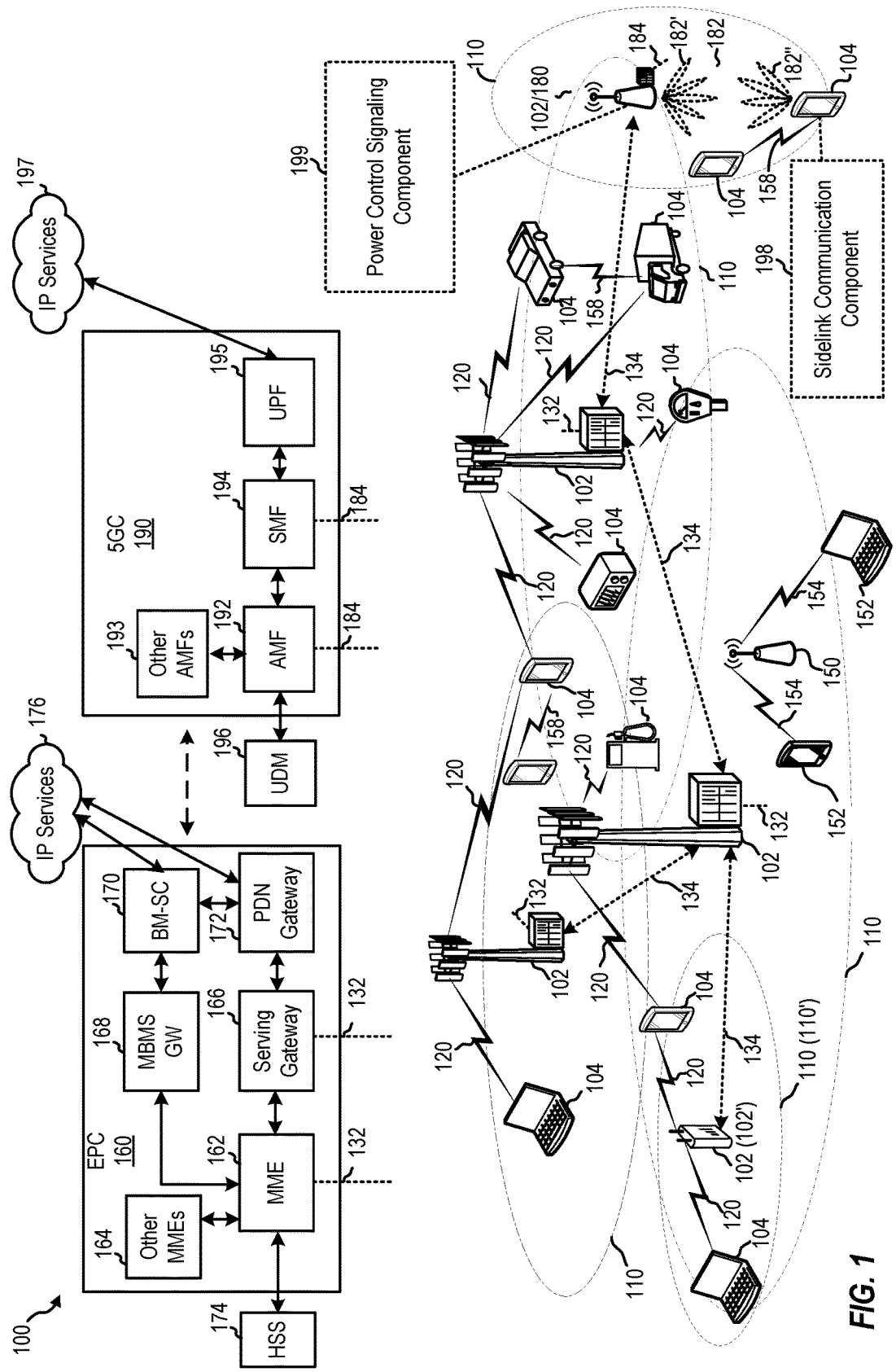
FIG. 1 is a block diagram conceptually illustrating an example wireless communication network.

Aspects of the present disclosure provide apparatuses, methods, processing systems, and computer-readable mediums for resource allocation in scenarios in which uplink and sidelink channels coexist.

In wireless communication systems, sidelink communications may be performed on resources in a sidelink resource pool. However, some of the resources in the sidelink resource pool may overlap with resources reserved or allocated for uplink communications between a user equipment (UE) and a network entity. This overlap scenario may exist, for example, when sidelink communications are performed over licensed spectrum. Because sidelink and uplink resources may overlap, a collision situation may exist in which transmission power on resources in the sidelink resource pool may cause interference on overlapping resources used by other UEs for uplink communications. These overlapping resources may overlap in the time domain, which may impact adjacent resources in the time domain, or may overlap in the time and frequency domains.

Aspects of the present disclosure provide techniques for controlling power on sidelink resources and identifying sidelink resources on which uplink transmissions may also be performed. Generally, as discussed herein, power control signaling may be used to indicate a power level that a UE can use for communications on a resource reserved for sidelink transmission. The UE may subsequently use the lower of the power level indicated in the power control signaling or a power level used to transmit signaling indicating a reservation of the resource for sidelink transmission. By doing so, other UEs can continue to rely on the power level used to transmit signaling to perform uplink transmissions on resources in which sidelink transmissions and uplink transmissions overlap.

By using a power level indicated in power control signaling and a power level used to transmit signaling indicating a reservation of resources to control the power used for sidelink transmissions by a UE, other UEs may not be adversely affected by power changes for sidelink transmissions by the UE. Other UEs may be able to assume that the maximum power used for a sidelink transmission is no greater than that used for the resource reservation signaling. Thus, these UEs may not be adversely affected by increased interference that may arise from sidelink transmissions on an overlapping resource performed using a power level greater than an expected power level.

Further, using, for sidelink transmissions, the lower of (1) a power level indicated in power control signaling and (2) a power level used to transmit the resource reservation may provide for various advantages in wireless communications systems. Resource utilization may be made more efficient, as communications may be performed using overlapping sidelink and uplink resources where the sidelink transmissions do not cause interference to uplink transmissions. UEs may also avoid performing transmissions where sidelink transmissions are likely to cause interference to uplink transmissions, which may improve the likelihood that a transmission is successfully received and may reduce resource utilization incurred through retransmission of a failed transmission. Still further, aspects of the present disclosure may reduce transmission power used for sidelink transmissions, which may improve the battery life of UEs that perform sidelink transmissions.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes power control signaling component 199, which may be configured to signal, to a UE, power control parameters for sidelink transmissions by the UE. Wireless network 100 further includes sidelink communication component 198, which may be configured to perform sidelink communications with other UEs and control the transmission power used for these sidelink communications.

Figure 2:
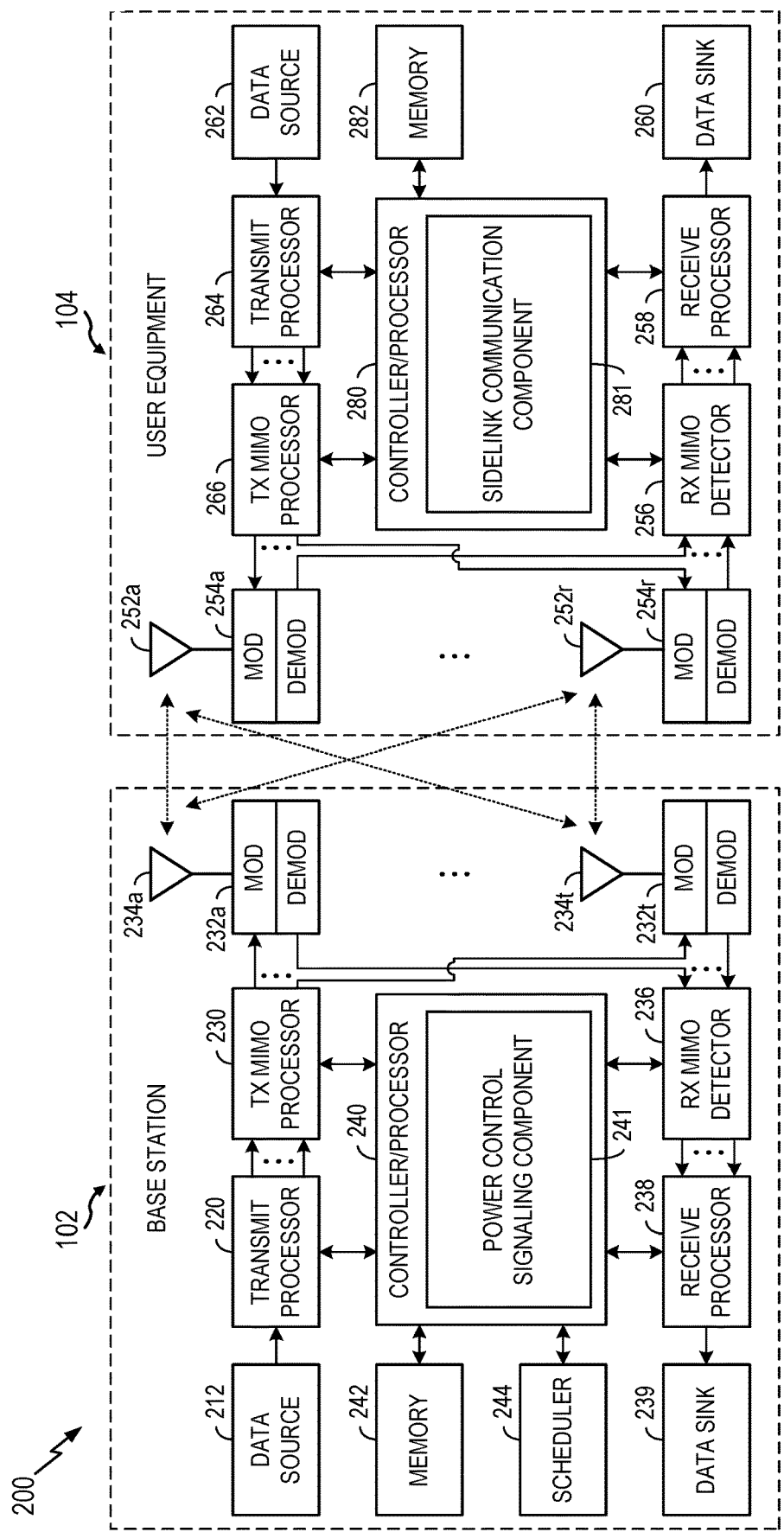
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes power control signaling component 241, which may be representative of power control signaling component 199 of FIG. 1. Notably, while depicted as an aspect of controller/processor 240, power control signaling component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes sidelink communication component 281, which may be representative of sidelink communication component 198 of FIG. 1. Notably, while depicted as an aspect of controller/processor 280, sidelink communication component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Sidelink Communications

In a wireless communications network, communications may be performed by scheduling entities that schedule communications by entities in the wireless communications network and subordinate entities that communicate according to scheduling information provided by the scheduling entities. Within the wireless communications network, the subordinate entities may also communicate with each other using a sidelink signal, which may refer to a signal communicated from one subordinate entity (e.g., a first UE) to another subordinate entity (e.g., a second UE) without relaying that communication through a scheduling entity (e.g., UE or BS), even though a scheduling entity may be utilized for scheduling and/or control purposes. In some examples, the sidelink signals may be communicated using a licensed spectrum (unlike wireless local area networks (WLANs), which typically use an unlicensed spectrum). Real-world applications of such sidelink communications may include public safety, proximity services, UE-to-network relaying, vehicle-to-vehicle (V2V) communications, Internet of Everything (IoE) communications, Internet of Things (IoT) communications, mission-critical mesh, and/or various other suitable applications.

Within a wireless communications system, a Uu path (cellular link) may be used for communications between a network entity (e.g., a gNodeB) and a user equipment. A PC5 path (sidelink), meanwhile, may be used for communications between UEs in a wireless network.

Figure 4:
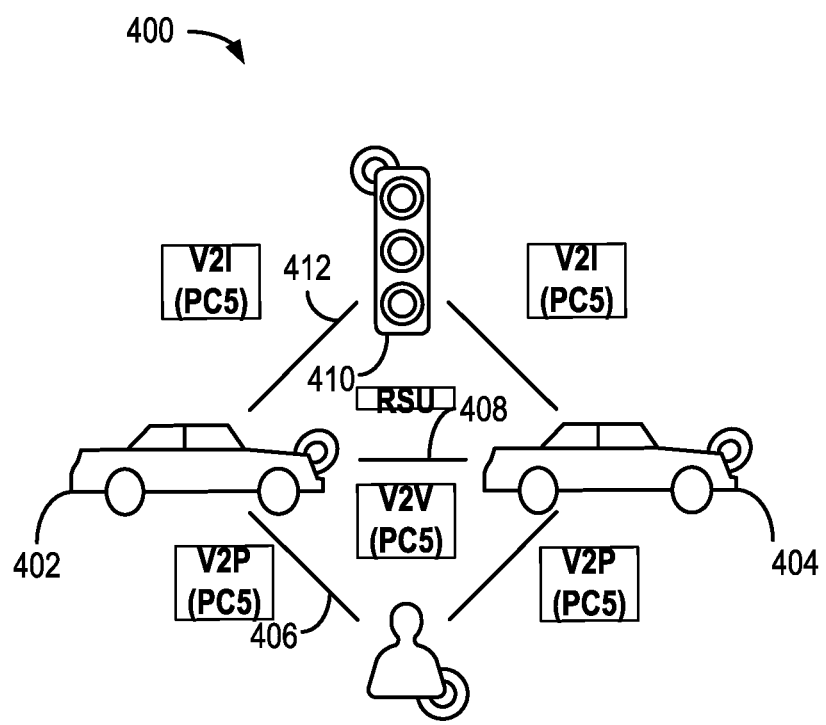
FIG. 4 shows a diagrammatic representation of an example vehicle to everything (V2X) systems in which communications via a sidelink channel may be performed.

FIG. 4 shows a diagrammatic representations of example of using sidelink communications in a vehicle to everything (V2X) system. For example, the vehicles shown in FIG. 4 may communicate via sidelink channels using the resource allocation and power control techniques described herein. It should be recognized that while FIG. 4 illustrates sidelink communications in the context of V2X systems, sidelink communications may be performed between various types of UEs, including, but not limited to, vehicle UEs and other UEs that may exist within a V2X system.

The V2X system illustrated in FIG. 4 provides a transmission mode involving direct sidelink communications between participants in proximity to one another in a local area. V2X system 400 (for example, including vehicle-to-vehicle (V2V) communications on a sidelink connection) is illustrated with two vehicles 402, 404. This transmission mode allows for direct communication (e.g., on a sidelink connection) between different participants in a given geographic location. As illustrated, a vehicle can have a wireless communication link 406 with an individual (i.e., vehicle to person (V2P), for example, via a UE) through a PC5 (sidelink) interface. Communications between the vehicles 402 and 404 may also occur through a PC5 (sidelink) interface 408. In a like manner, communication may occur from a vehicle 402 to other highway components (for example, roadside service unit 410), such as a traffic signal or sign (i.e., vehicle to infrastructure (V2I)) through a PC5 (sidelink) interface 412. With respect to each communication link illustrated in FIG. 4, two-way communication may take place between elements, therefore each element may be a transmitter and a receiver of information. The V2X system 400 may be a self-managed system implemented without assistance from a network entity in which resources for communications on sidelink channels may be scheduled autonomously using the techniques described herein. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

Aspects Related to Resource Allocation in Uplink and Sidelink Coexistence

Resources allocated for sidelink communications may be allocated using various schemes. For example, in a first scheme, a network entity (e.g., a base station or gNodeB) can dynamically schedule sidelink resources for a transmitting sidelink UE. The network entity may additionally configure sidelink resources for a transmitting sidelink UE such that the sidelink resources are defined a priori.

As another example, in a second scheme, UEs can reserve sidelink resources based on sensing operations that determine whether resources are available or reserved by other UEs (e.g., reserved via resource reservation signaling broadcast or otherwise signaled by the other UEs). Generally, sidelink communications may be restricted to a sidelink resource pool that is configured by a network entity for a UE. However, the network entity can configure a sidelink resource pool to overlap with uplink resources for communications between a UE and a network entity.

To control transmission power for sidelink communications, open loop power control may be supported. In various aspects, these open loop power control procedures may be configured to use downlink pathloss (e.g., between a transmitting UE and a network entity), sidelink pathloss (e.g., between a transmitting UE and a receiving UE), or both to determine sidelink transmission power. Generally, open loop power control using downlink pathloss may ensure that sidelink communications do not interfere with communications between a UE and a network entity, while open loop power control using sidelink pathloss may be used to ensure that sidelink communications are successfully received by a receiving UE.

Open loop power control is generally based on configured power control parameters that are used, in conjunction with various pathloss measurements, to determine a transmission power to be used in a subsequent transmission. Generally, the power control parameters may include a $P_0$ parameter representing a nominal transmission power and an a parameter representing a fractional power control parameter, both of which may be configured for and signaled to the UE. Power control based on downlink pathloss may be represented by the equation:

$$P_D = P_{0,D} + 10 \log_{10}(2^\mu \cdot M_{RB}(i)) + \alpha_D \cdot PL_D \quad (1)$$

where $P_D$ represents the calculated downlink transmission power, $P_{0,D}$ represents a configured nominal downlink transmission power, $\alpha_D$ represents the downlink fractional power control parameter, $PL_D$ represents the measured downlink pathloss, μ represents a subcarrier spacing configuration, and $M_{RB}(i)$ represents a number of resource blocks for a given downlink channel.

Power control based on sidelink pathloss may be represented by the equation:

$$P_S = P_{0,S} + 10 \log_{10}(2^\mu \cdot M_{RB}(i)) + \alpha_D \cdot PL_S \quad (2)$$

where $P_S$ represents the calculated sidelink transmission power, $P_{0,S}$ represents a configured nominal sidelink transmission power, as represents the sidelink fractional power control parameter, $PL_S$ represents the measured sidelink pathloss, μ represents a subcarrier spacing configuration, and $M_{RB}(i)$ represents a number of resource blocks for a given sidelink channel. When both downlink pathloss and sidelink pathloss are used in open loop power control, the minimum of the power values given by open loop power control based on downlink pathloss and open loop power control based on sidelink pathloss may be taken as the transmission power.

The configured power control parameters may be changed semi-statically such that the configured power control parameters may be configured for the UE via radio resource control (RRC) signaling or other signaling that is applicable for an extended period of time. However, when a UE uses a semi-static power control approach, sidelink power control may not be adapted based on activity between the network entity and the UE. In such a case, if the reference pathloss is based on downlink pathloss, sidelink performance may be negatively impacted. For example, the effective range of sidelink communications may be reduced. If, however, the reference pathloss is based on sidelink pathloss, sidelink interference may negatively impact uplink communications between UEs and the network entity.

Various techniques may be used to dynamically control sidelink transmission power to address the impacts of semi-static power control parameter configuration discussed above. In scenarios in which sidelink resource allocation is dynamically scheduled by the network entity, various techniques may be used. In one example, a network entity can configure multiple sets of open loop power control parameters for use in calculating a transmission power using one of Equations 1 or 2 above based on measured downlink pathloss or measured sidelink pathloss metrics, with the applicable set of power control parameters being dynamically indicated by the network entity. In another example, a transmit power offset may be included in downlink control information (DCI) provided to the sidelink UEs. The indications provided by the network entity may be specific to a UE or a group of UEs, specific to particular resources on which sidelink communications may be performed, including common sidelink resources used by multiple UEs, or may be zone specific (e.g., applicable to a plurality of UEs within a given geographical area, coverage area, etc.).

However, in scenarios in which UEs can reserve sidelink resources based on sensing operations that determine whether resources are available or reserved by other UEs, the dynamic signaling described above may not allow for UEs to independently adjust power control parameters and determine whether resources are available for transmission. In this scenario, changes in sidelink transmission power can impact the sensing results and can lead to increased probability of collisions between sidelink transmissions and uplink transmissions.

Figure 5:
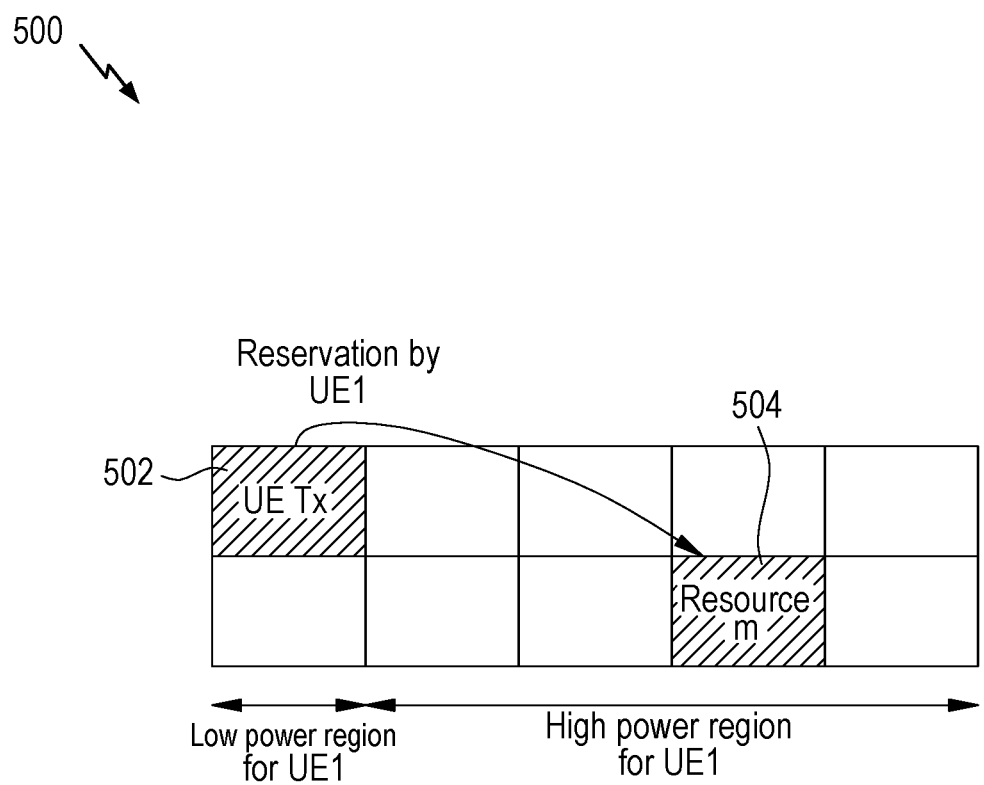
FIG. 5 depicts an example reservation of a resource for sidelink communications by a user equipment.

FIG. 5 illustrates an example timeline 500 in which a first UE reserves resources for sidelink transmission.

In this example, the first UE is instructed by a network entity (e.g., through power control signaling transmitted by power control signaling component 199 or 241 illustrated in FIG. 1 or 2) to reduce its transmission power when transmitting on a given resource 502. On resource 502, the UE transmits a reservation of resource m 504 for use in a subsequent sidelink transmission. The first UE will generally reduce its transmission power on the resource 502, and then resume transmissions on other resources using a higher (normal) power level.

When a second UE detects the reservation transmitted by the first UE on resource 502 (e.g., in sidelink control information transmitted by the first UE) reserving the resource m 504, the second UE may measure a received power metric (e.g., reference signal received power (RSRP) or other power metrics) and determine that the resource m 504 is available based on a comparison of the measured received power metric and a threshold value which may represent a maximum power on which sidelink transmissions can be received by the second UE without causing interference to uplink transmissions performed by the second UE. If the first UE transmits using a low transmission power on resource m 504 (e.g., such that the measured received power metric is at or less than the threshold value), there may be minimal impact on transmissions performed by the second UE on resource m 504, even though both the first and the second UEs are transmitting on a same resource. Thus, the second UE can perform uplink transmissions on resource m 504 without experiencing interference from a sidelink transmission performed by the first UE on resource m 504. If, however, the first UE increases its transmission power for a transmission on resource m 504, the second UE may be unaware of the increase in power and may experience interference due to the increase in transmission power by the first UE.

Thus, techniques are needed for sidelink power control that allows UEs to rely on power measurements from resource reservation signaling to determine whether resources are available for use in overlapping sidelink and uplink transmission.

Figure 6:
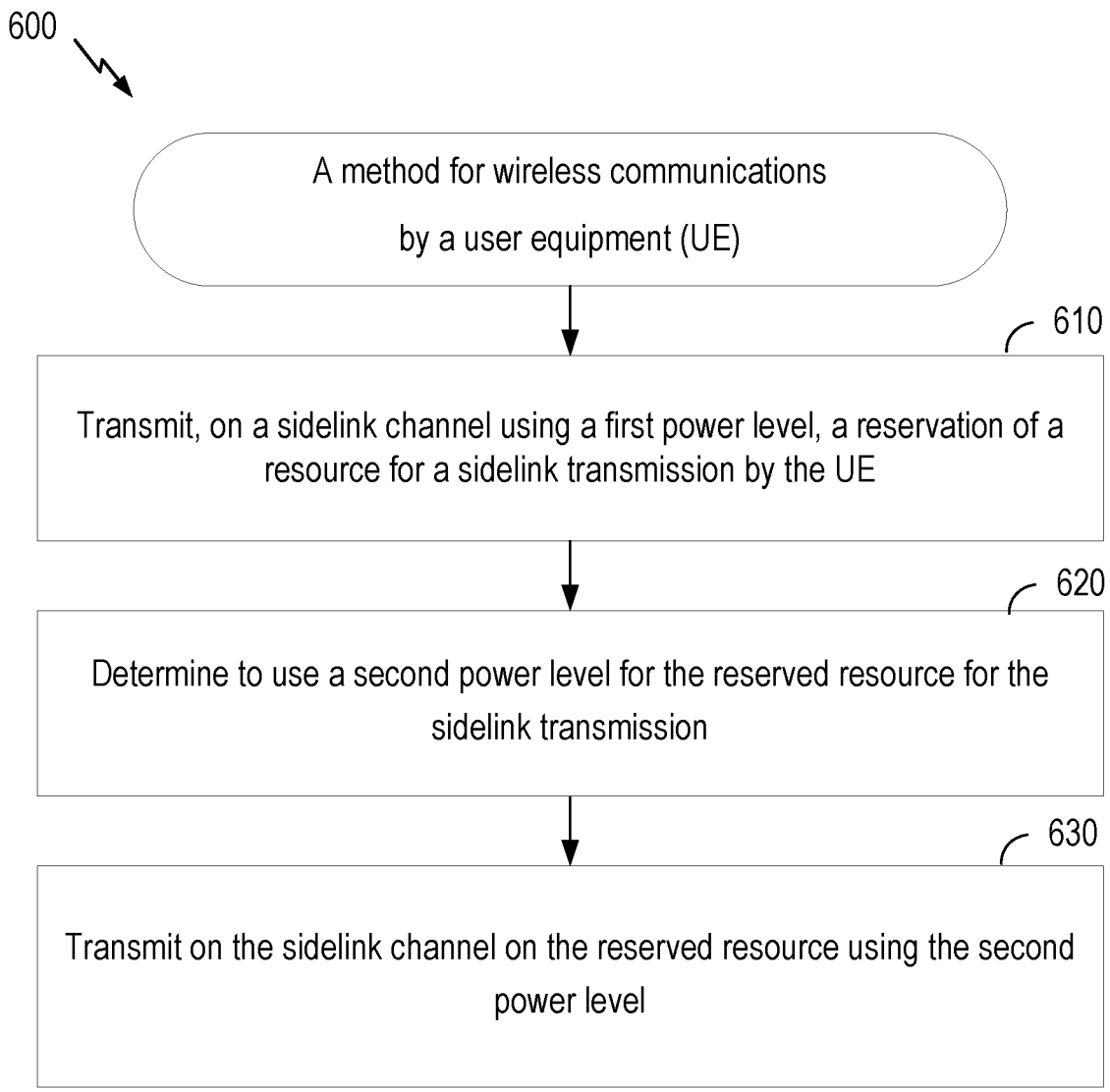
FIG. 6 depicts example operations that may be performed by a user equipment for sidelink communications in a wireless communication system.

FIG. 6 illustrates example operations 600 that may be performed by a user equipment (UE) to perform sidelink communications (e.g., transmissions on reserved resources), according to aspects of the present disclosure. Operations 600 may be performed, for example, by sidelink communication component 198 or sidelink communication component 281 illustrated in FIG. 1 or 2.

As illustrated, operations 600 begin at block 610, where the UE transmits, on a sidelink channel using a first power level, a reservation of a resource for a sidelink transmission by the UE. For example, the reservation of the resource may correspond to the reservation transmitted on resource 502 illustrated in FIG. 5 and discussed above. The reservation of the resource may, in some aspects, be transmitted while the UE is operating in a first power region associated with the first power level. This first power region may be designated as a low power level region.

At block 620, the UE determines to use a second power level for the reserved resource for the sidelink transmission. In some aspects the determination to use a second power level for the reserved resource may be based on power control signaling received from a network entity, a UE, a relay, or another device in a wireless communications network. The power control signaling may indicate the second power level to use for transmissions on the reserved resource.

In some aspects, the power control signaling may indicate that the second power level corresponds to a power level that is lower than the first power level. This power control signaling may explicitly specify the second power level or may specify that the second power level is calculated based on a negative offset from the first power level.

In some aspects, a UE may receive, from another UE, a sidelink control information (SCI) including the power control signaling. As discussed, the power control signaling may include a transmission power offset associated with the reserved resources. For example, the transmission power offset indicated in the power control signaling may be applicable to the next resource in the reserved resources, but not be applicable to other resources in the reserved resources.

In some aspects, the UE may receive, from the network entity, configuration information including a set of transmission power offsets. The power control signaling may include a transmission power offset selected from the set of transmission power offsets. The set of transmission power offsets may include a set of power offsets specific to the UE or a set of power offsets associated with one of a plurality of resource pools.

At block 630, the UE transmits on the sidelink channel on the reserved resource using the second power level.

In some aspects, the transmission on the sidelink channel on the reserved resource, such as that corresponding to the transmission on resource m 504 illustrated in FIG. 5, may be performed while the UE is operating in a second power region in which the UE is allowed to perform transmissions using a power level higher than the first power level. This second power level region may be designated as a higher power level region. While the UE may perform transmissions in the second power level region at a power higher than the first power level, sidelink transmissions on the reserved resources may be performed using a power level that is capped at the first power level so as to not cause unexpected interference to uplink transmissions by other UEs in a wireless communications system.

In some aspects, the reservation of resources may include a plurality of resources on which the UE can perform sidelink transmissions. The at least one resource on which the UE performs sidelink transmissions may be a next resource of the reserved resources. For example, if the reservation of resources identifies a set of resources {1, 2, . . . , n} ordered in the time domain, the at least one resource on which the UE performs sidelink transmissions using a power level based on the lower of the first power level or the second power level may be resource 1. The power level used for sidelink transmissions on resources {2, . . . , n} may be based on the lower of the first power level or a power level indicated in a subsequent reservation of resources other than the next resource (e.g., in a subsequent reservation of resources identifying at least resource 2 as a reserved resource for sidelink transmissions).

By transmitting on a sidelink channel based on a lower of a first power level used to transmit a reservation of resources or a second power level indicated by power control signaling received by the UE, aspects of the present disclosure may minimize unexpected interference to UEs that have previously determined that uplink transmissions can be performed on the reserved resources. These UEs may be able to rely on an assumption that the transmission power used for a sidelink transmission on the reserved resources is at or below a power related to a measured received power on the resources used to transmit the reservation. Thus, for UEs that have determined that the sidelink transmission on the reserved resources will not cause interference to uplink transmissions by the UEs to a network entity, uplink transmissions may be performed without experiencing unexpected interference that may cause additional radio resources and power to be used for retransmissions of these uplink transmissions.

In some aspects, a UE that detects a reservation of resources transmitted by a second UE can use power measurements on the resource on which the reservation is transmitted to determine whether the UE is allowed to perform uplink transmissions on the reserved resources.

Figure 7:
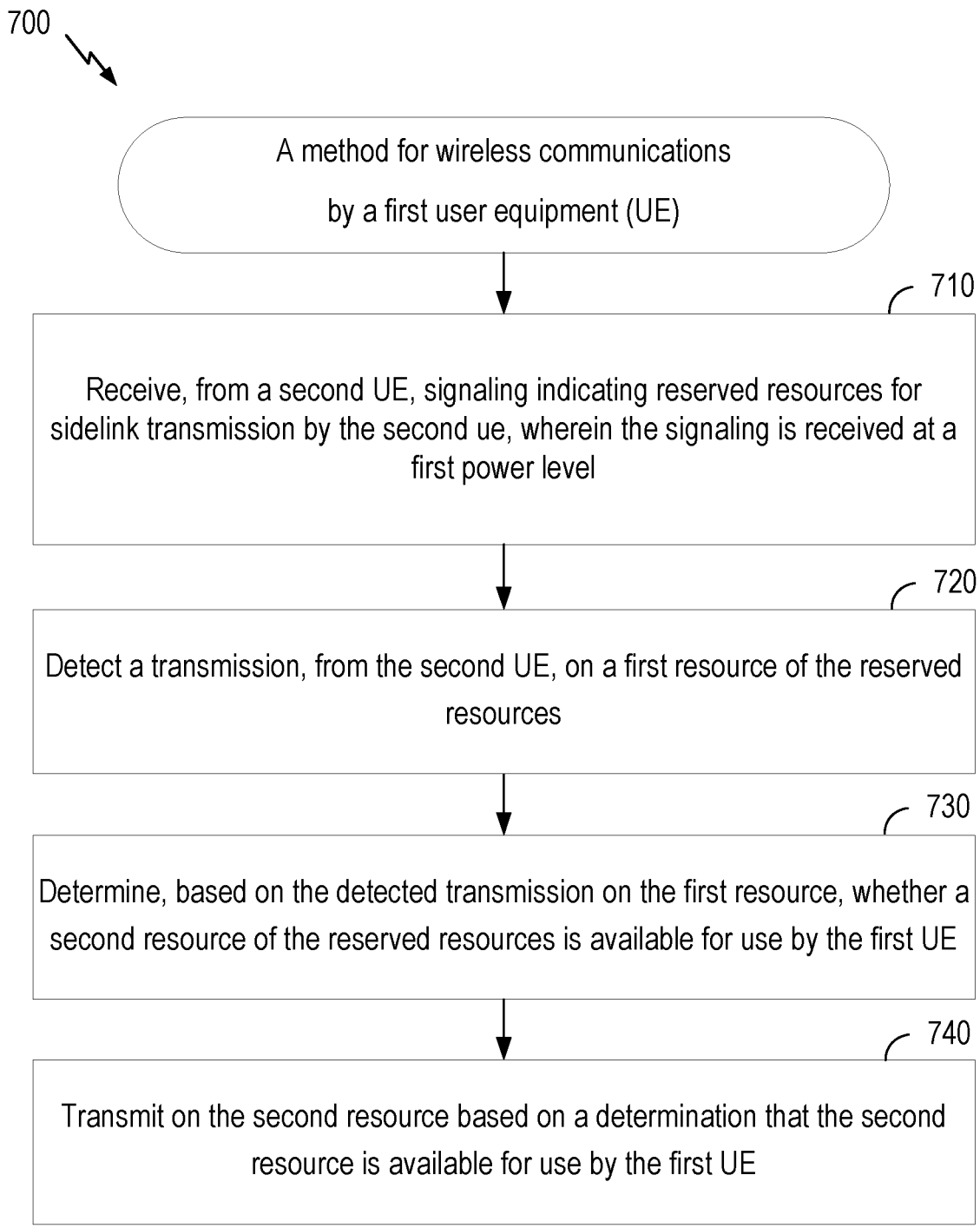
FIG. 7 depicts example operations that may be performed by a user equipment for sidelink communications in a wireless communication system.

FIG. 7 illustrates example operations 700 that may be performed by a first user equipment (UE) to perform wireless communications (e.g., uplink transmissions to a network entity) on resources reserved for sidelink communications, according to aspects of the present disclosure. Operations 700 may be performed, for example, by sidelink communication component 198 or sidelink communication component 281 illustrated in FIG. 1 or 2.

As illustrated, operations 700 begin at block 710, where the first UE receives, from a second user equipment (UE), signaling indicating reserved resources for sidelink transmission by the second UE. The signaling may be received at a first power level.

At block 720, the first UE detects a transmission, from the second UE, on a first resource of the reserved resources. This transmission on the first resource of the reserved resources may include, for example, a sidelink control information (SCI) message transmitted by the second UE. The SCI may indicate a subsequent reservation of resources for sidelink transmissions by the second UE and power control information that the first UE can use to determine whether the reserved resources are available to be used in performing uplink transmissions to a network entity.

At block 730, the first UE determines, based on the detected transmission on the first resource, whether a second resource of the reserved resources is available for use by the UE.

In some aspects, to determine whether a second resource of the reserved resources is available for use by the UE, the UE can use transmission power offset information included in the detected transmission. Generally, to determine whether a second resource of the reserved resources is available for use by the UE, the UE can calculate a transmission power using Equation 2 described above, a measured pathloss, a measured received signal strength, and the transmission power offset. The UE may receive configuration including a set of transmission power offsets that the UE can use in determining whether a second resource of the reserved resources is available for use. This configuration information may be received, for example, in radio resource control (RRC) signaling (e.g., when the UE attaches to a network entity) or in downlink control information (DCI) signaling (e.g., for dynamic signaling of the transmission power offset information). The set of transmission power offsets may include, for example, a set of power offsets specific to the UE, or a set of power offsets associated with one of a plurality of resource pools or component carriers.

To determine whether the second resource is available for use by the UE, the UE can measure a signal strength metric and modify the measured signal strength metric based on a selected power offset indicated in the detected transmission on the first resource. If the measured signal strength metric, modified by the selected transmission power offset, is less than a threshold signal strength metric, the UE can determine that the second resource is available for use for uplink transmissions to a network entity (e.g., that sidelink transmissions by the second UE on the second resource will not cause unacceptable interference to uplink transmissions by the UE to the network entity). Otherwise, the UE can determine that the second resource is not available for use for uplink transmissions to the network entity and can schedule uplink transmissions on another resource.

At block 740, the UE transmits on the second resource based on a determination that the second resource is available for use by the UE.

Generally, by monitoring the received power level for reservations of resources by a second UE, the UE can selectively transmit on resources such that uplink transmissions by the UE are not affected by interference caused by sidelink transmissions performed by the second UE. Thus, the likelihood that uplink transmissions are successfully received by the network entity may be increased, and resource utilization due to retransmission of failed uplink transmissions may be minimized.

Generally, when a UE is configured to monitor for indications from a network entity of another UE to dynamically change sidelink transmission power on a given resource m, and resource m is already reserved by the UE via a transmission (e.g., of sidelink control information) at a first power level, the transmission power of the UE on resource m may not exceed the first power level. Thus, to avoid interference to transmissions by other UEs on resource m, the UE may not increase its transmission power beyond the first power level, even if power control signaling from the gNB indicates that the UE is allowed to transmit using a second power level that is greater than the first power level. This may allow for sidelink transmissions by a first UE on a resource m to not impact other sidelink UEs or uplink reception at the network entity.

Referring back to the diagram illustrated in FIG. 5, it can be seen that the reservation transmitted on resource 502 is transmitted while the UE is operating in a first power region (e.g., in which the UE performs transmissions using the first power level), and resource m is scheduled in a second power region in which the UE is allowed to perform transmissions using a power level higher than the first power level.

In some aspects, the UE may perform transmissions at a given power level P and may receive an indication to lower transmission power on a reserved resource m. Reserving a resource m at a power level P and transmitting on the resource m at a lower power level generally does not increase the chance of a collision on the resource m, as UEs that have determined that communications on resource m are not likely to be negatively impacted by a sidelink transmission transmitted at power level P. Thus, if a resource m is reserved by the UE using a first power level and the UE receives an indication that a second power level that is less than the first power level is to be used for transmissions on resource m, the UE can reduce its transmission power to the second power level.

Figure 8:
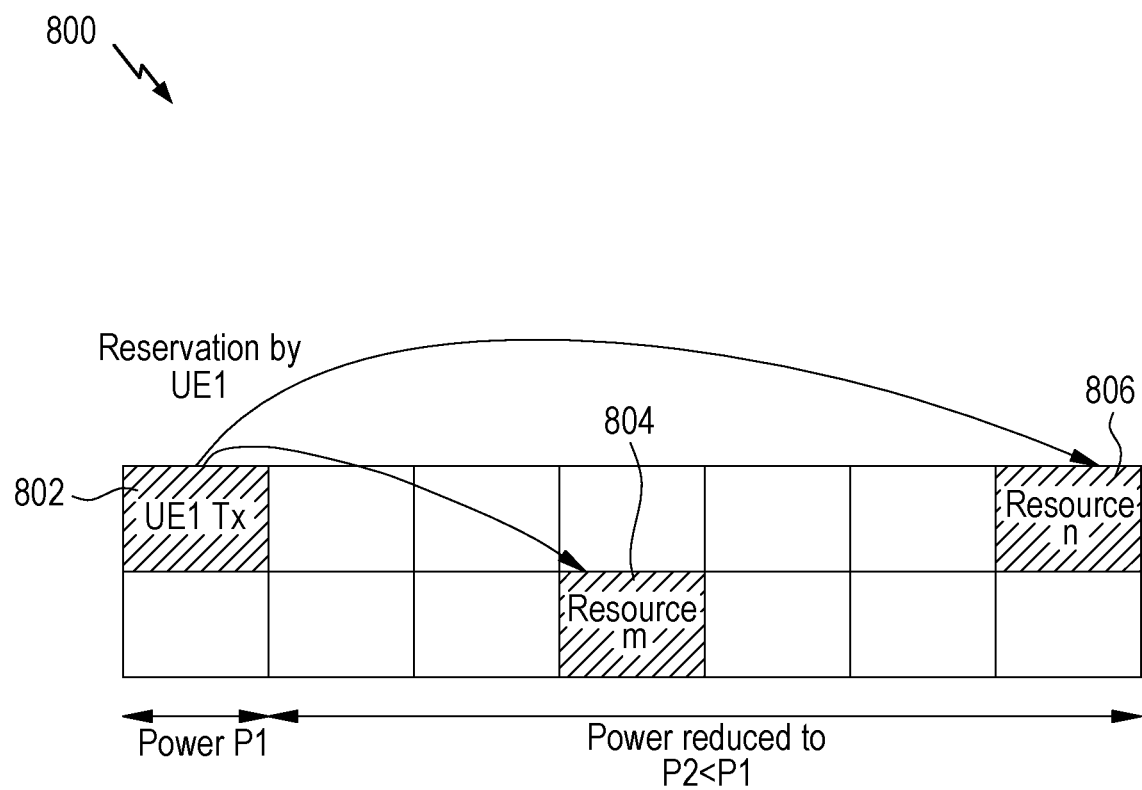
FIG. 8 depicts an example reservation of multiple resources for sidelink communications by a user equipment.

FIG. 8 illustrates a scenario in which a reservation of resources transmitted at a first power level reserves a plurality of resources.

In this example, a reservation transmitted on resource 802 (e.g., in sidelink control information (SCI) signaling by the first UE), reserves resource m 804 and resource n 806. The reservation may be transmitted on resource 802 using a first power level, and resources m and n may be transmitted in a region in which a second power level less than the first power level may be used for these transmissions. Because the transmission on resource m 804 is at a power level less than the first power level, other UEs that detected the reservation of resources m and n transmitted on resource 802 and measured a signal quality metric above a threshold may have already considered resource m 804 (as well as resource n 806) to be unavailable for use. Some UEs, however, may not detect the reservation of resources m and n on resource 802, but may receive a reservation of resource n 806 transmitted by the first UE on in information received in resource m 804. Even though the reservation of resource n 806 is made using a second power level that is less than the first power level, the reservation at a lower power level does not erroneously allow other UEs to determine that that resource n 806 is available for use, as the lower power level remains a power level below the threshold power level over which sidelink transmissions would cause interference to uplink transmissions by these other UEs. Thus, the reservation of resource n 806 using the second power level may not increase the chances of a collision on resource n 806.

Transmitting using a lower power level may decrease resource efficiency. For example, in cases where the UE is allowed to increase its transmission power but does not, transmission reliability may be impacted, and more resources may be needed to successfully transmit a transmission block (e.g., to account for re-transmissions performed in response to receipt of a negative acknowledgment or a failure to receive an acknowledgment, to account for repetitions used to increase the likelihood that a transmission succeeds, etc.). In cases where the UE transmits with a lower power on reserved resources, other UEs may not be aware that a lower power is being used for sidelink transmissions on these resources, and thus, these other UEs may not attempt to reuse these resources, even though these resources are potentially available for use.

Aspects Related to Resource Availability Determination Based on Power Offset Signaling In some aspects, to further increase resource efficiency (e.g., to allow other UEs to more accurately determine whether uplink transmissions can be performed on resources reserved for sidelink transmissions by a UE, such as resource 504 illustrated in FIG. 5 or resources 804 and 806 illustrated in FIG. 8), SCI signaling from a UE may include power control information. The power control information may be, for example, a value in a power offset field. The power offset field may indicate a transmission power offset for resources reserved by the UE (e.g., in the SCI signaling). In some aspects, the power control signaling may be applied to a first resource of a plurality of resources that are reserved by the UE. For example, where a UE reserves resources m and n, and m precedes n, the power control signaling may be applicable to resource m, but not to resource n. Power control signaling received, for example, in an SCI transmitted by the UE on resource m may thus include power control information that is applicable to resource n, but not to subsequent resources beyond resource n that may be reserved in the SCI.

The value of the power offset field may be 0 (indicating no change to a transmission power), a positive offset value indicating a power increase, or a negative offset value indicating a power decrease. The offset value may be selected based on commands received from a network entity or another UE or relay node and may be selected from a preconfigured set of power offset values provided to the UE by the network entity (e.g., when the UE attaches to the network). The set of power offset values may be configured, for example, on a per-UE basis, a per-resource-pool basis, or a per-component-carrier basis. In some aspects, the set of values may be configured based on the subchannels used for transmission of the physical sidelink shared channel, as transmissions closer to an edge of a channel may impose interference on adjacent channels.

When a UE detects an SCI transmitted on a resource m reserving a resource n, the UE can determine whether the resource n is available for use by applying the indicated offset to the measured received signal power metric. The sum of the indicated offset and the measured received signal power metric may be compared to a threshold value. If the sum of the indicated offset and the measured received signal power metric exceeds the threshold value, the UE can determine that the resource n is unavailable for use; otherwise, the UE can determine that the resource n can be used for uplink transmissions to a network entity.

Example Wireless Communication Devices

Figure 9:
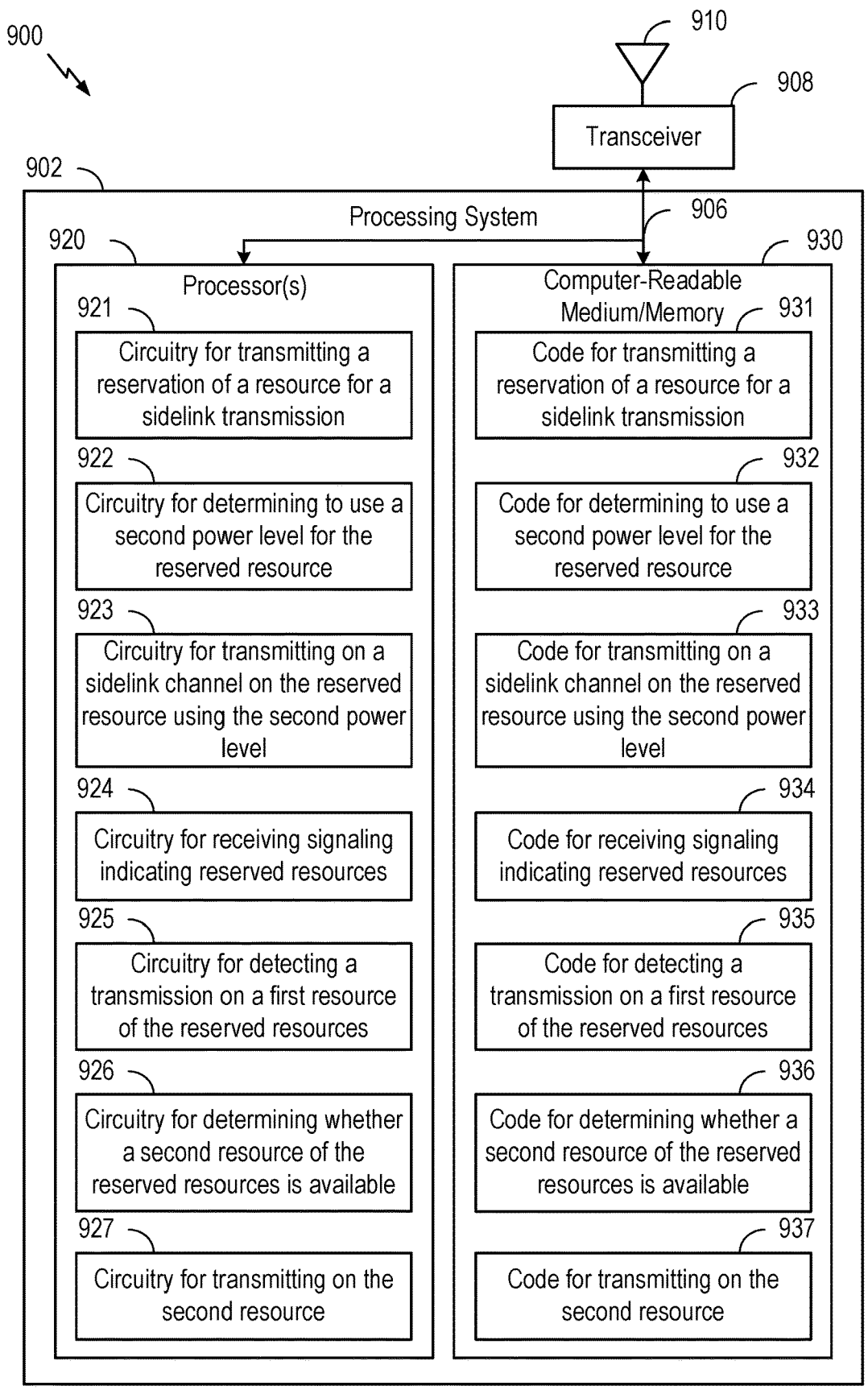
FIG. 9 depicts aspects of an example communications device.

FIG. 9 depicts an example communications device 900 that includes various components operable, configured, or adapted to perform operations for the techniques disclosed herein, such as the operations depicted and described with respect to FIG. 6 or 7. In some examples, communication device 900 may be a user equipment 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 6 or 7, or other operations for performing the various techniques discussed herein for sidelink communications by a user equipment.

In the depicted example, computer-readable medium/memory 930 stores code 931 for transmitting a reservation of a resource for a sidelink transmission, code 932 for determining to use a second power level for the reserved resource, code 933 for transmitting on a sidelink channel on the reserved resource using the second power level, code 934 for receiving signaling indicating reserved resources, code 935 for detecting a transmission on a first resource of the reserved resources, code 936 for determining whether a second resource of the reserved resources is available, and code 937 for transmitting on the second resource.

In the depicted example, the one or more processors 920 include circuitry configured to implement the code stored in the computer-readable medium/memory 930, including circuitry 921 for transmitting a reservation of a resource for a sidelink transmission, circuitry 922 for determining to use a second power level for the reserved resource, circuitry 923 for transmitting on a sidelink channel on the reserved resource using the second power level, circuitry 924 for receiving signaling indicating reserved resources, circuitry 925 for detecting a transmission on a first resource of the reserved resources, circuitry 926 for determining whether a second resource of the reserved resources is available, and circuitry 927 for transmitting on the second resource.

Various components of communications device 900 may provide means for performing the methods described herein, including with respect to FIG. 6 or 7.

In some examples, means for transmitting or sending (or means for outputting for transmission) may include the transceivers 254 and/or antenna(s) 252 of the user equipment 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the user equipment 104 illustrated in FIG. 2 and/or transceiver 908 and antenna 910 of the communication device 900 in FIG. 9.

In some examples, means for communicating may include various processing system components, such as: the one or more processors 920 in FIG. 9, or aspects of the user equipment 104 depicted in FIG. 2, including receive processor 258, transmit processor 264, TX MIMO processor 266, and/or controller/processor 280 (including sidelink communication component 281).

Notably, FIG. 9 is just one example, and many other examples and configurations of communication device 900 are possible.

Example Clauses

Implementation examples are described in the following numbered clauses:

Clause 1: A method for wireless communications by a user equipment (UE), comprising: transmitting, on a sidelink channel using a first power level, a reservation of a resource for a sidelink transmission by the UE; determining to use a second power level for the reserved resource for the sidelink transmission; and transmitting on the sidelink channel on the reserved resource using the second power level.

Clause 2: The method of Clause 1, wherein: the reservation of the resource comprises a reservation for a plurality of resources, and determining to use the second power level for the reserved resource for the sidelink transmission comprises determining to use the second power level on an earliest reserved resource of the plurality of resources.

Clause 3: The method of Clause 1, wherein determining to use the second power level for the reserved resource for the sidelink transmission comprises receiving power control signaling indicating the second power level.

Clause 4: The method of Clause 3, wherein the power control signaling is received from one of: a network entity, a second UE, or a relay.

Clause 5: The method of Clauses 3 of 4, further comprising receiving a sidelink control information (SCI) message including the power control signaling.

Clause 6: The method of Clause 5, wherein the power control signaling comprises a transmission power offset associated with the reserved resource for the sidelink transmission.

Clause 7: The method of Clauses 5 or 6, further comprising receiving, from a network entity, configuration information including a set of transmission power offsets, wherein the power control signaling comprises a transmission power offset selected from the set of transmission power offsets.

Clause 8: The method of Clause 7, wherein the set of transmission power offsets comprise a set of power offsets specific to the UE.

Clause 9: The method of Clauses 7 or 8, wherein the set of transmission power offsets comprise a set of power offsets associated with one of a plurality of resource pools.

Clause 10: The method of any one of Clauses 3 through 9, wherein the second power level is lower than the first power level.

Clause 11: The method of any one of Clauses 1 through 10, wherein: the UE is configured to transmit the reservation of the resource while operating in a first power region, and the UE is configured to transmit on the reserved resource while operating in a second power region, wherein the second power region is a lower power region than the first power region.

Clause 12: The method of any one of Clauses 1 through 11, wherein the reserved resource comprises a plurality of reserved resources.

Clause 13: The method of Clause 12, further comprising transmitting on the sidelink channel on another resource of the plurality of reserved resources using the first power level.

Clause 14: A method for wireless communications by a user equipment (UE), comprising: receiving, from a second UE, signaling indicating reserved resources for sidelink transmission by the second UE, wherein the signaling is received at a first power level; detecting a transmission, from the second UE, on a first resource of the reserved resources; determining, based on the detected transmission on the first resource, whether a second resource of the reserved resources is available for use by the UE; and transmitting on the second resource based on a determination that the second resource is available for use by the UE.

Clause 15: The method of claim 14, further comprising: receiving, from a network entity, configuration information including a set of transmission power offsets.

Clause 16: The method of claim 15, wherein the set of transmission power offsets comprise a set of power offsets specific to the UE.

Clause 17: The method of claim 15, wherein the set of transmission power offsets comprise a set of power offsets associated with one of a plurality of resource pools Clause 18: The method of any one of Clauses 15 through 17, wherein: the detected transmission on the first resource includes an indication that the second resource is reserved for the second UE to use for sidelink transmission and an indication of a selected transmission power offset from the set of transmission power offsets to use in determining whether the UE can perform transmissions on the second resource, and determining whether the second resource is available for use by the UE comprises determining whether a measured signal strength metric, modified by the selected transmission power offset, is less than a threshold signal strength metric.

Clause 19: The method of any one of Clauses 14 through 18, wherein the detected transmission on the first resource comprises a sidelink control information (SCI) message.

Clause 20: An apparatus, comprising: a memory comprising executable instructions; one or more processors configured to execute the executable instructions and cause the apparatus to perform a method in accordance with any one of Clauses 1-19.

Clause 21: An apparatus, comprising means for performing a method in accordance with any one of Clauses 1-19.

Clause 22: A non-transitory computer-readable medium comprising executable instructions that, when executed by one or more processors of an apparatus, cause the apparatus to perform a method in accordance with any one of Clauses 1-19.

Clause 23: A computer program product embodied on a computer-readable storage medium comprising code for performing a method in accordance with any one of Clauses 1-19.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of resource allocation in sidelink and downlink coexistence in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first user equipment (UE) for wireless communication, comprising:
a memory; and
a processor coupled to the memory, wherein the processor is configured to:
receive, from a second UE, signaling indicating reserved resources for sidelink transmission by the second UE, wherein the signaling is received at a first power level;
detect a transmission, from the second UE, on a first resource of the reserved resources;
determine, based on the detected transmission on the first resource, whether a second resource of the reserved resources is available for use by the first UE; and
transmit on the second resource based on the determination.

2. The first UE of claim 1, wherein the processor is further configured to receive, from a network entity, configuration information including a set of transmission power offsets.

3. The first UE of claim 2, wherein the set of transmission power offsets comprise a set of power offsets specific to the first UE.

4. The first UE of claim 2, wherein the set of transmission power offsets comprise a set of power offsets associated with one of a plurality of resource pools.

5. The first UE of claim 2, wherein:
the detected transmission on the first resource includes an indication that the second resource is reserved for the second UE to use for sidelink transmission and an indication of a particular transmission power offset from the set of transmission power offsets, and
to determine whether the second resource is available for use by the first UE, the processor is configured to determine whether a measured signal strength metric, modified by the particular transmission power offset, is less than a threshold signal strength metric.

6. The first UE of claim 1, wherein the detected transmission on the first resource comprises sidelink control information (SCI).

7. The first UE of claim 1, wherein the processor is configured to:
receive the signaling indicating the reserved resources while operating in a first power region, and
detect transmission on the reserved resources while operating in a second power region,
wherein the second power region is a lower power region than the first power region.

8. A method of wireless communication by a first user equipment (UE), comprising:
receiving, from a second UE, signaling indicating reserved resources for sidelink transmission by the second UE, wherein the signaling is received at a first power level;
detecting a transmission, from the second UE, on a first resource of the reserved resources;
determining, based on the detected transmission on the first resource, whether a second resource of the reserved resources is available for use by the first UE; and
transmitting on the second resource based on the determination.

9. The method of claim 8, further comprising receiving, from a network entity, configuration information including a set of transmission power offsets.

10. The method of claim 9, wherein:
the detected transmission on the first resource includes an indication that the second resource is reserved for the second UE to use for sidelink transmission and an indication of a particular transmission power offset from the set of transmission power offsets, and
determining whether the second resource is available for use by the first UE comprises determining whether a measured signal strength metric, modified by the particular transmission power offset, is less than a threshold signal strength metric.

11. The method of claim 8, wherein the detected transmission on the first resource comprises sidelink control information (SCI).

12. The method of claim 8, wherein:
receiving the signaling indicating the reserved resources for sidelink transmission by the second UE comprises receiving the signaling indicating the reserved resources while operating in a first power region, and
detecting transmission on the reserved resources comprises detecting transmission on the reserved resources while operating in a second power region,
wherein the second power region is a lower power region than the first power region.

13. A non-transitory computer-readable storage medium having stored thereon instructions that, when executed, cause a processor of a first user equipment (UE) to:
receive, from a second UE, signaling indicating reserved resources for sidelink transmission by the second UE, wherein the signaling is received at a first power level;
detect a transmission, from the second UE, on a first resource of the reserved resources;
determine, based on the detected transmission on the first resource, whether a second resource of the reserved resources is available for use by the first UE; and
transmit on the second resource based on the determination.

14. The non-transitory computer-readable storage medium of claim 13, further comprising instructions that cause the processor to receive, from a network entity, configuration information including a set of transmission power offsets.

15. The non-transitory computer-readable storage medium of claim 14, wherein the set of transmission power offsets comprise a set of power offsets specific to the first UE.

16. The non-transitory computer-readable storage medium of claim 14, wherein the set of transmission power offsets comprise a set of power offsets associated with one of a plurality of resource pools.

17. The non-transitory computer-readable storage medium of claim 14, wherein:
the detected transmission on the first resource includes an indication that the second resource is reserved for the second UE to use for sidelink transmission and an indication of a selected transmission power offset from the set of transmission power offsets to use in determining whether the first UE can perform transmissions on the second resource, and
the instructions that cause the processor to determine whether the second resource is available for use by the first UE comprise instructions that cause the processor to determine whether a measured signal strength metric, modified by the selected transmission power offset, is less than a threshold signal strength metric.

18. The non-transitory computer-readable storage medium of claim 13, wherein the detected transmission on the first resource comprises sidelink control information (SCI).

19. The non-transitory computer-readable storage medium of claim 13, further comprising instructions that cause the processor to:
receive the signaling indicating the reserved resources while operating in a first power region, and
detect transmission on the reserved resources while operating in a second power region, wherein the second power region is a lower power region than the first power region.

* * * * *